H. H. STYLL.
PERISCOPE.
APPLICATION FILED JULY 31, 1918.
1,341,683.
Patented June 1, 1920.
2 SHEETS—SHEET 1.
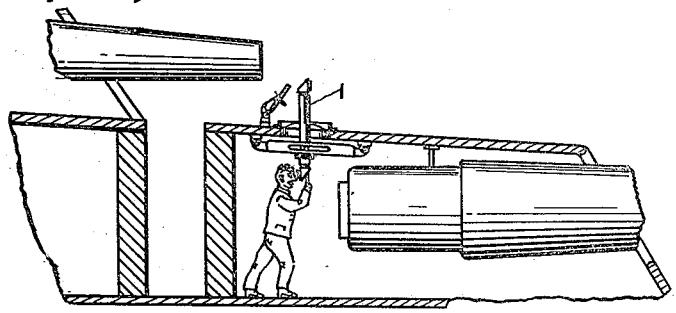
FIG. I
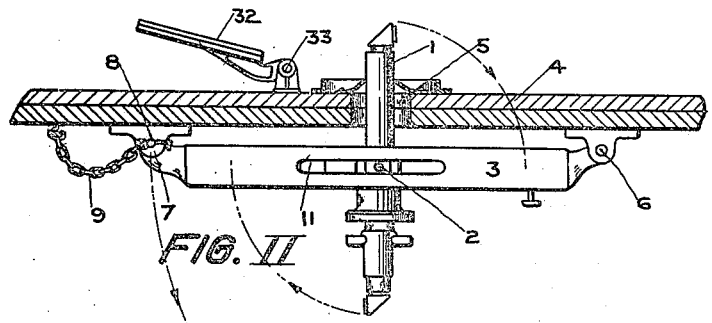
FIG. II
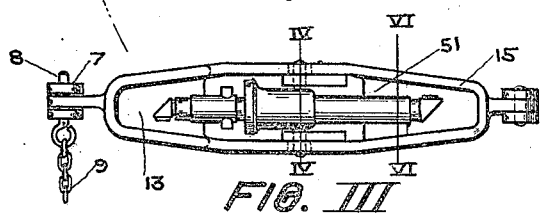
FIG. III
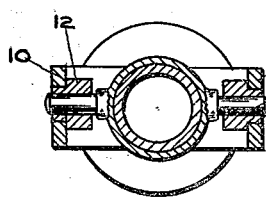
FIG. IV
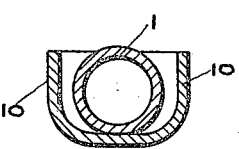
FIG. VI
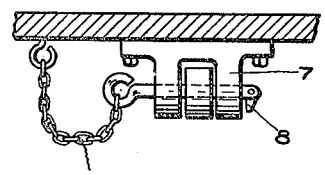
FIG. VII
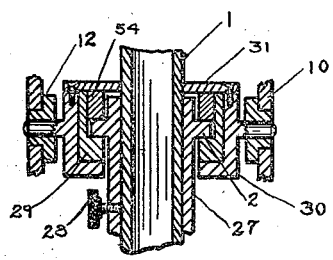
FIG V
INVENTOR
HARRY H. STYLL
BY
H. H. Styll  H. K. Parsons
ATTORNEYS

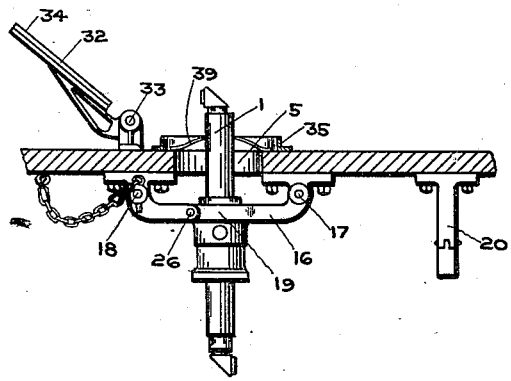
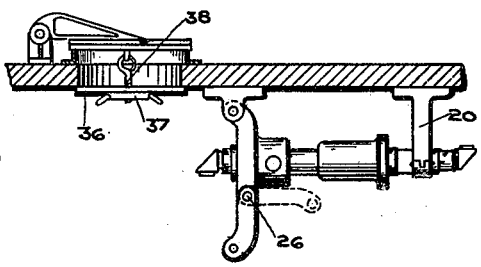
FIG. VIII    FIG. IX
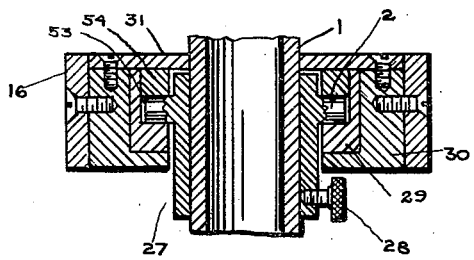
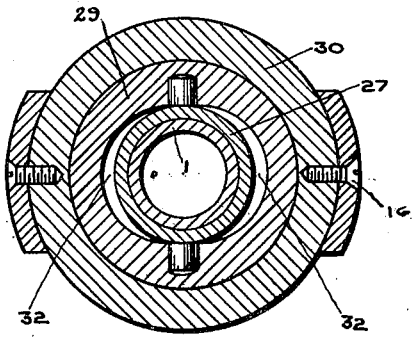
FIG. X    FIG. XI
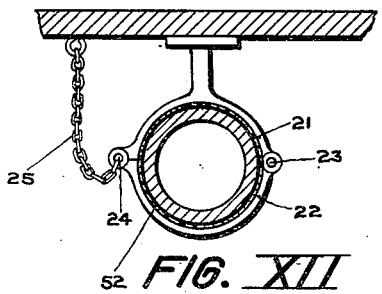
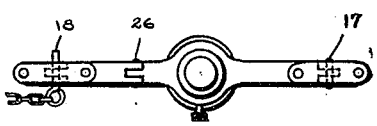
FIG. XII    FIG. XIII
INVENTOR
HARRY H. STYLL

UNITED STATES PATENT OFFICE.

HARRY H. STYLL, OF SOUTHBRIDGE, MASSACHUSETTS.

PERISCOPE.

1,341,683.  Specification of Letters Patent.  Patented June 1, 1920.

Application filed July 31, 1918. Serial No. 247,521.

*To all whom it may concern:*

Be it known that I, HARRY H. STYLL, a citizen of the United States, residing at Southbridge, in the county of Worcester and State of Massachusetts, have invented certain new and useful Improvements in Periscopes, of which the following is a specification.

My invention relates to improvements in observation glasses for taking observations from behind a screen or barrier, and consists in providing means whereby an optical instrument may be universally mounted for operative and stowage position in relation to the observation point of the barrier.

The objects of my invention are:

First, to provide a sighting instrument allowing observations to be made in all directions;

Second, to provide means for automatically throwing the instrument into operative position or into stowed position;

Third, to provide means to lock the instrument in any desired position, either operatively placed or stowed;

Fourth, to prevent water from entering the barrier when the instrument is in use;

Fifth, to cover the opening in the barrier and to lock the cover in place when the instrument is removed from the opening in the barrier.

I attain these objects by the construction illustrated in the accompanying drawings, showing preferred forms of my invention, in which the optical instrument is pivoted in a cradle arranged to hold the instrument either in operative or stowed position with respect to the opening in the barrier, and in which:

Figure I represents a sectional elevation through the opening in the roof of a turret, showing the instrument in operative position.

Fig. II is an enlargement of Fig. I, showing an elevation of the instrument in operative position.

Fig. III is a plan or top view of Fig. II, showing the instrument in stowed position in the cradle.

Fig. IV is a transverse cross section on line IV—IV of Fig. III, the instrument being in operative position rather than in stowed position.

Fig. V is a vertical cross section of Fig. IV, instrument in operative position.

Fig. VI is a transverse cross section of Fig. III on line VI—VI, the instrument being in stowed position.

Fig. VII is a left hand end view of Fig. III.

Fig. VIII is a sectional elevation through the opening in the barrier showing a modified form with the instrument in operative position.

Fig. IX is the same as Fig. VIII, showing the instrument in stowed position.

Fig. X is a sectional elevation through the instrument at the point of its swiveled or pivotal connections.

Fig. XI is a transverse cross section through the instrument at the point of its pivotal connection.

Fig. XII is a right hand end view of Figs. VIII and IX.

Fig. XIII is a bottom view of Fig. VIII.

Similar numerals refer to similar parts through the several views.

Referring to the drawings, in a preferred form a periscope or observation instrument 1 is pivoted or journaled at 2 in a supporting cradle 3 which is supported in conjunction with the barrier 4 in such a way that the instrument 1 may extend up through the opening 5 in the barrier for the purpose of taking observations outside of the barrier, or the same may be revolved on the pivots 2 so it may lie in stowed position in the cradle on the inside of the barrier.

The cradle 3 is journaled or pivoted in the socket 6 so that it may be swung down around the journal 6. The other end of the cradle 3 opposite the journal 6 is held in position by means of a socket 7 and toggle pin 8, said toggle pin being secured in place on the barrier by means of a chain 9.

Referring to Fig. IV it will be seen that the middle section of the cradle 3 is made in the form of open guides 10, there being no bottom or top between these guides, at the pivotal point the space being free to allow the instrument to revolve or be stowed in operative position. The guides 10 have a longitudinal slot or opening 11 in which are fitted the swivel blocks 12, which carry the pivots 50. The object of the slots 11 is to allow the instrument 1 to remain in vertical or operative position, while the cradle 3 is being dropped down about its pivot 6. The instrument 1 being pivoted at 50 on the blocks 12 is enabled to retain its vertical or operative position while the block 12 is changing its position longitudinally in the slots 11, the operation being that the blocks 12 retain their position with respect to the opening in the barrier, the cradle 3 altering its position in this respect by means of the movement along the slot 11 on the blocks 12. When the instrument 1 has been brought down sufficiently far for it to clear the opening 5 in the barrier, the instrument is rotated on its pivots 50 until it approximates a horizontal position in the cradle. It is then pushed over longitudinally on the blocks 12 in the slots 11 until its upper end comes over the bottom wall or diaphragm 13 on which it will rest in stowed position as shown in Fig. III.

It will be noted that a portion of the bottom of the cradle 3 shown in Fig. III, marked 13, has been closed or walled across. When the instrument 1 has been rotated and slid longitudinally to assume its stowed position in the cradle 3, the upper end of the instrument 1 rests on the cross piece bottom of the cradle 13 and the lower end is held in place by a similar cross piece diaphragm 51, the instrument being slipped far enough longitudinally to clear the edge of the diaphragm 51, when slipped back so the lower end is allowed to rest thereon. In this way both ends of the instrument are supported by a diaphragm when in stowed position. When it is desired to throw the instrument into operative position, it is necessary only to reverse the action, the instrument is slipped longitudinally till the lower end clears the edge of diaphragm 51, and is then rotated on its pivots till it assumes the vertical or operative position.

An alternative arrangement is shown in Figs. VIII and IX. Fig. VIII shows the instrument in operative position and Fig. IX shows the instrument in stowed position. In this device the cradle 16 is pivoted at 17 and held in locked position by the toggle pin at 18. The instrument 1 is locked in the cradle at 19 so that it remains permanently fixed with respect thereto at an angle of about 90 degrees, so that when the cradle is revolved about its pivot 17 the instrument 1 travels in an arc with the cradle into the stowed position shown in Fig. IX. It will be understood that in this arrangement the opening 5 in the barrier has to be sufficiently wide to allow for the travel of the upper end of the periscope in an arc about the pivot 17.

When it is desired to stow the instrument, the pin is taken out at 18 and the instrument rotated in its cradle about the pivot 17 until it becomes horizontal with the under side of the barrier, the lower end having entered in the meantime the retaining collar 20 shown in detail in Fig. XII. This collar is made in two portions, the upper half 21 and the lower half 22, the lower half being hinged at the point 23 and held in position with the upper half by a pin at 24, said pin being secured to the barrier by means of the chain 25.

The holding face of the collar 20 may be lined with felt or leather 52 or other suitable material to prevent marring or abrading the surface of the instrument 1.

To carry the instrument from the stowed position to operative position it is only necessary to remove the pin at 24 and rotate the instrument in its cradle around the pivot 17 until it reaches its operative position in the barrier and lock the cradle into place with the pin at 18.

To gain more head room the cradle 16 may be made in two pieces as shown in Figs. VIII and IX, these two pieces being hinged at 26, so that when the instrument is held in stowed position as shown in Fig. IX, the lower portion of the cradle may be revolved about its hinged joint 26 to horizontal position, thus providing additional head room.

A detailed arrangement for raising and lowering the periscope with respect to its pivot is shown in Fig. X. A collar or slide ring 27 bearing the pivots 2 is fitted around the instrument 1. This collar is locked in desired longitudinal position on the instrument 1 by means of the set screw 28. Surrounding the collar 27 is the collar or pivot ring 29, carrying sockets for the pivots 2. The collar 29 may be rotated in the bearing collar or guide ring 30 which surrounds it, the collar 29 being held in place in the bearing collar 30 by means of the plate 31. The pivots 2 are entered in the ring 29 by means of the openings 53 therein, which are filled in with the blocks 54, held in place by the plate 31.

The method of operating the instrument in both the horizontal and vertical planes is shown in detail in Fig. XI. A careful analysis of the objects of the instrument will show that it is only necessary in order to locate with the vision pieces in the instrument any object to make it possible to rotate the instrument 360 degrees in the horizontal plane and to tilt it back and forth slightly in the vertical plane. Training in the horizontal field is obtained by twisting the instrument so that the collar 29 will rotate in the bearing ring 30. As the collar 29 carries the pivots with it the instrument may be moved around to any point on the horizon and tilted at that point to any desired elevation or depression. The elevation and depression is obtained by allowing a clearance in one direction only between the pivot rings 27 and the ring 29, as shown in Fig. XI. This clearance is indicated at the points 32 in Fig. XI. In view of the fact that the pivots move around with the ring 29 this clearance point will always travel with the pivots and thus the instrument may be tilted back and forth in this plane at any desired point on the horizon.

This tilting feature is a very important one when the instrument is used as a periscope on a battle ship or on a vessel of any kind as the ship is constantly pitching or rolling due to the action of the waves on the hull of the vessel; thus it is necessary to move the instrument back and forth on its pivots to compensate for the movement of the boat.

It is very desirable also where the instrument is subjected to weather that the same should be protected when not in use. With this end in view a permanent hatch or cover is provided and also an inside or flexible cover fitting around the instrument is provided for use when the instrument is in operative position. The hatch cover 32 is hinged at 33 and is provided with a rubber gasket or band fitted around its edges which comes in contact with the hatch combing 35, and may be held in place thereon by means of a strong back 36, held in place by means of the screw keeper 37 and the bolt 38 shown in Fig. IX. The strong back spans the opening 5 in the barrier and the screw bolt 38 passes through it so that when the screw keeper 37 is screwed up on it the hatch 32 will be drawn down tight on the combing 35. The hatch may be released by unscrewing the keeper 37, and throwing the hatch back around its hinge 33.

The water is kept out of the opening in the barrier 5 when the instrument is in use by means of a rubber or cloth cover 39 which is snugly fitted around the instrument 1 and overlaps the edges of the opening in the barrier 5. This is shown in Fig. VIII.

Fig. I shows the instrument in use in the turret of a battle-ship, which turret is arranged as usual to have a rear turret fire over its top. The necessity for removing the periscope when the gun in the rear turret is fired is very apparent as the blast from the rear gun would sweep the periscope away if it protruded above the top.

The operation of the various elements and details of the invention have been described above wherein the detail parts were described. In operation the action of the instrument is very simple, the instrument being carried in a cradle, which cradle holds it in position in the opening in the barrier when it is desired to operate the instrument. When the cradle is released it falls back and is secured in such position as to act as a cradle for the instrument, holding it out of the way and in convenient stowed relation to the opening in the barrier, thus making the instrument always ready for use whether in operative position or in stowed position, thus providing great saving in time and facility of operation. The instrument is so arranged as to travel the full 360 degrees in a horizontal plane and to travel a predetermined number of degrees in elevation and depression, so that it may be simply and conveniently held either in operative or stowed position.

What I claim as new and desire to cover by Letters Patent is:

1. In a device for taking observations, the combination of a sighting instrument, a bifurcated transverse cross member embracing the instrument between the bifurcations, pivotal connections between the instrument and the bifurcations of the cross member whereon the instrument may be swung to lie between the bifurcations of the cross member and pivotal connections on the cross member adapted to secure the cross member to a barrier whereon the cross member and with it the instrument may be swung as an entity.

2. In a device of the character described, a tubular sighting instrument, a slide ring around the tube, locking means adapted to lock the slide on the tube in desired position, a pivot ring surrounding the slide ring, pivotal connections between the slide and pivot rings, and a guide ring surrounding the pivot ring having guides wherein the pivot ring may rotate.

3. In a sighting device of the character described, a tubular sighting instrument, a slide ring around the tube, a pivot ring surrounding the slide ring, pivotal connections between the slide and pivot ring, a guide ring surrounding the pivot ring having guides wherein the pivot ring may rotate, and an elongated opening in the pivot ring wherein the tube may oscillate back and forth on its pivots.

4. In a sighting device of the character described, a tubular sighting instrument, a slide ring around the tube, a pivot ring around the slide ring, pivotal connections between the slide and pivot rings, and an elongated opening in the pivot ring wherein the tube may oscillate back and forth on its pivots.

5. In a device of the character described, a sighting instrument, a transverse supporting cross member intermediate the ends of the instrument, means whereon the instrument may be rotated on its longitudinal axis in the cross member, means whereon the instrument may be swung into a position parallel with the cross member, and means for supporting the instrument in the latter position.

6. In a device for taking observations from behind barriers, the combination of a sighting instrument, a supporting cradle for the instrument, means for holding the instrument in the cradle transversely to the barrier, means whereon the instrument may be swung in the cradle, and means for holding the instrument in the cradle parallel with the barrier.

7. In a device of the character described, a sighting instrument, means whereon the instrument may be rotated about its longitudinal axis as a center, a supporting cradle, means whereon the instrument may be slid longitudinally in the cradle, and means for pivoting the instrument in the sliding means whereon the instrument may be swung from its longitudinal position in the cradle to a position transverse to the cradle and vice versa.

8. A cradle for a sighting instrument comprising a receptacle cross member, means for locking the cross member in position on a barrier, means wherein the instrument may be slipped longitudinally in the cross member, and means whereon the instrument may be swung from a position transverse to the cross member to one substantially parallel therewith.

9. A cradle for a sighting instrument, comprising a U-shaped shell cross member, means for pivoting the cross member to a barrier, means for locking the cross member in position on a barrier, and longitudinal guides on the sides of the cross member.

10. In a device of the character described, a sighting instrument, a U-shaped shell cross member, pivotal connections between the instrument and the cross member, pivotal connections for securing the cross member in place to a barrier, guides on the sides of the cross members, slides in the guides, and pivotal connections between the slides and the sighting instrument.

11. In a device of the character described, in combination with a barrier having an opening, a sighting instrument projecting through the opening, a shell shaped cross member supporting the instrument in the opening, means whereon the instrument may be rotated about its longitudinal axis, means whereon the instrument may be oscillated back and forth, means for pivoting the cross member to remove the instrument from the opening, and means for locking the cross member in position when the instrument is removed from the opening in the barrier.

12. In a device of the character described, a sighting instrument, a cradle support intermediate its ends, means for pivoting the instrument in the cradle, diaphragms in the cradle separated by a space less than the length of the instrument, and guides on the cradle whereon the instrument may be slipped through the space between the diaphragms to lie thereon.

13. In a device for taking observations from behind a barrier, a sighting instrument, means for supporting the instrument to project beyond the barrier, means whereon the instrument may be swung down behind the barrier, and means for locking the instrument behind the barrier and parallel thereto.

14. In a device for taking observations from behind barriers, a sighting instrument, a cradle for holding and supporting the instrument, means for securely holding the instrument and cradle together, means in which the instrument may be rotated with its longitudinal axis as a center, pivotal means on which the instrument may be oscillated transversely to its longitudinal axis, means on the cradle for hinging it to a barrier, and means on the cradle by which it may be locked in fixed relationship to a barrier.

15. In a device for taking observations from behind barriers, a sighting instrument, a bifurcated cradle for holding and supporting the instrument, cross connecting means holding the instrument securely in place between the bifurcations of the cradle, means in the cross connecting means wherein the instrument may be raised or lowered, means in said cross connecting means wherein the instrument may be rotated on its longitudinal axis, means in said cross means whereon the instrument may be oscillated transversely to its longitudinal axis, means on the cradle for hinging it to a barrier, and means on the cradle by which it may be locked in fixed relationship to a barrier.

In testimony whereof I have affixed my signature, in presence of two witnesses.

HARRY H. STYLL.

Witnesses:
 H. E. COLEMAN,
 H. K. PARSONS.